United States Patent [19]
Sarno

[11] Patent Number: 5,309,779
[45] Date of Patent: May 10, 1994

[54] FOUR DEAD CENTERS CRANK MECHANISM

[76] Inventor: Cosimo Sarno, Via San Filippo, 32, 1-84062 Olevano Sul Tusciano, Italy

[21] Appl. No.: 721,427
[22] PCT Filed: Nov. 13, 1989
[86] PCT No.: PCT/IT89/00075
    § 371 Date: Jul. 3, 1991
    § 102(e) Date: Jul. 3, 1991
[87] PCT Pub. No.: WO90/05862
    PCT Pub. Date: May 31, 1990

[30] Foreign Application Priority Data

Nov. 16, 1988 [IT] Italy ................. 64821 A/88

[51] Int. Cl.⁵ .................................... F16H 21/18
[52] U.S. Cl. ............................ 74/44; 74/51; 74/45
[58] Field of Search ....................... 74/44, 45, 51

[56] References Cited

U.S. PATENT DOCUMENTS

| | | | |
|---|---|---|---|
| 64,450 | 5/1867 | Rowell | 74/44 |
| 752,237 | 2/1904 | Lineback | 74/44 |
| 1,091,629 | 3/1914 | Campbell | 74/44 X |
| 1,128,885 | 2/1915 | Livingston | 74/44 |
| 1,410,119 | 3/1922 | Krause | 74/44 |
| 1,874,194 | 8/1932 | King | |
| 2,392,921 | 1/1946 | Holman | 74/44 X |
| 3,633,429 | 1/1972 | Olson | 74/44 |
| 3,918,317 | 11/1975 | Claussen | 74/51 X |
| 4,300,405 | 11/1981 | Szczepanek | 74/44 |
| 4,596,160 | 6/1986 | Andersen et al. | 74/44 X |

FOREIGN PATENT DOCUMENTS

| | | |
|---|---|---|
| 440465 | 2/1927 | European Pat. Off. |
| 272660 | 7/1927 | European Pat. Off. |
| 522792 | 6/1940 | European Pat. Off. |

*Primary Examiner*—Allan D. Herrmann
*Assistant Examiner*—David W. Laub
*Attorney, Agent, or Firm*—Staas & Halsey

[57] ABSTRACT

A crank mechanism for the transformation of a rotary movement of a crank supported in a crankcase into reciprocating movement of a piston in a cylinder, includes an open kinematic chain composed of three pivotally connected rods with the ends of the chain being pivotally connected to the crankcase. The piston is connected to one of the intermediate pivotal connections of the three rods by another rod and a crank pin of the crank mechanism is connected to the other intermediate pivotal connection of the three rods by still another rod. Four dead centers can be obtained with the crank mechanism.

4 Claims, 5 Drawing Sheets

FOUR DEAD CENTERS CRANK MECHANISM

BACKGROUND OF THE INVENTION

The present invention relates to a new type of crank mechanism and a variant thereof, in order to improve thermodynamic efficiency and to reduce the quantity of polluting masses for every cycle and to attenuate the closing forces between the piston and the cylinder wall.

These aims will be pursued operating by means of the particular kinematism on the law that regulates the motion of the piston in function of crank angle.

BRIEF DESCRIPTION OF THE DRAWINGS

Two embodiments of the invention will be shown in the following drawings.

DESCRIPTION OF THE PREFERRED EMBODIMENTS

Figure 7:
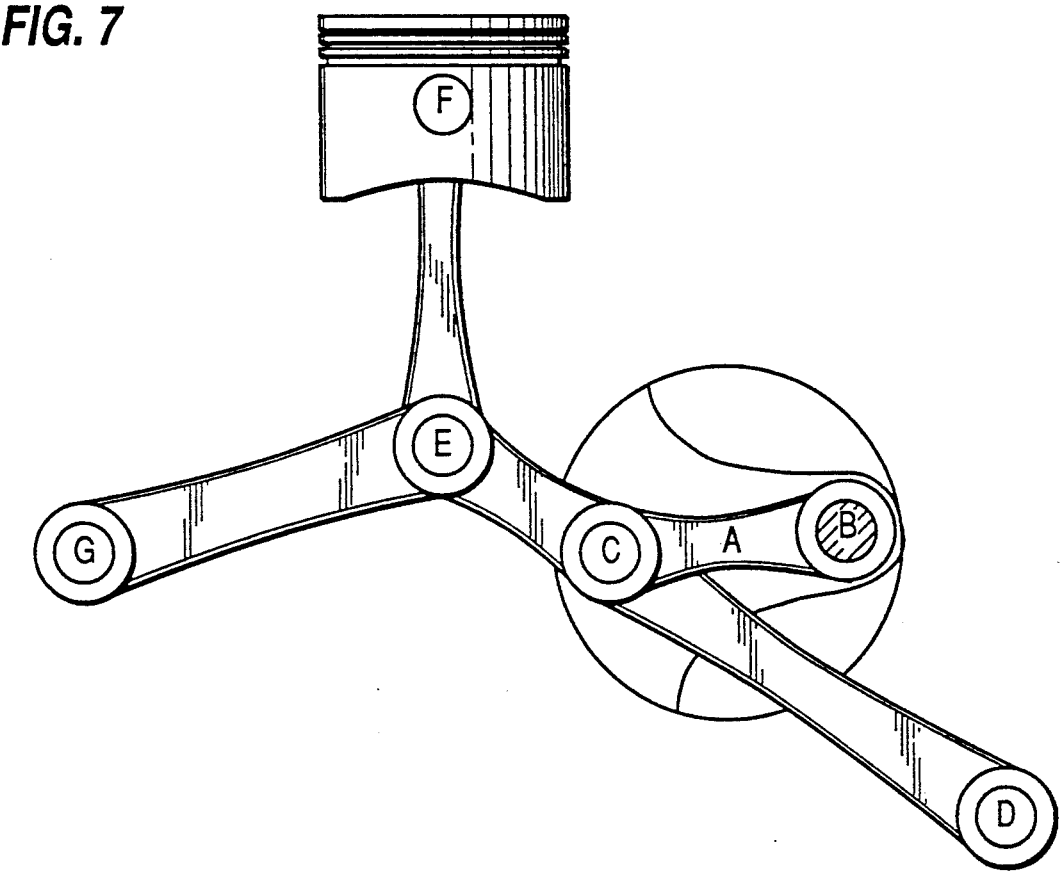
FIG. 7 is a sectional view taken along line 7—7 of FIG. 8.
Figure 8:
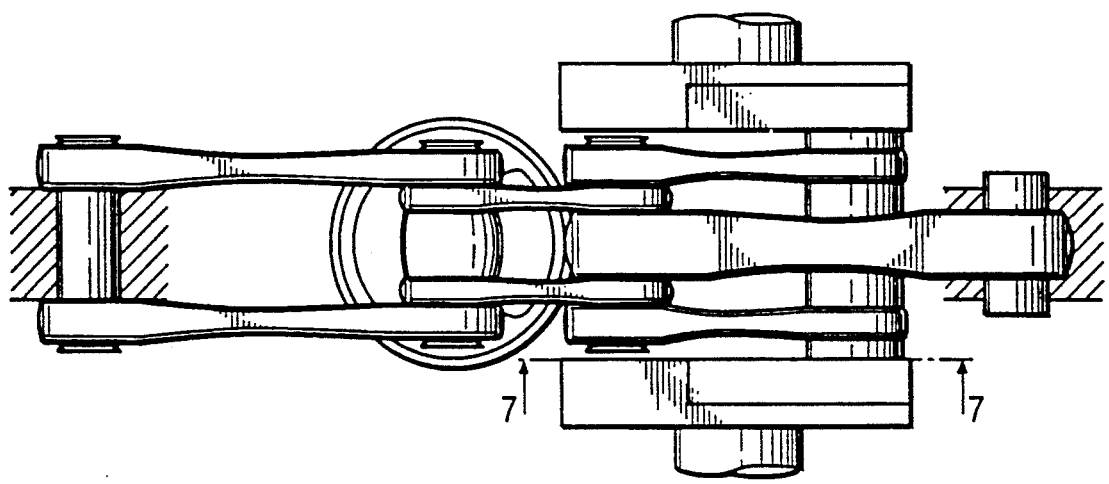
FIG. 8 is a top view of a single crank mechanism according to the present invention.

The crank mechanism of the present invention is formed, in its schematic description (FIG. 1) and in its real one (FIGS. 7 and 8) by a traditional crank mechanism (rods A-B and B-C) in which the connecting rod small end (point C) is pivotally or hingedly connected to two rods (rods C-D and E-C) rod C-D has an extremity pivotally or hingedly connected to the crankcase (point D) while the other rod E-C is pivotally or hingedly connected by means of the extremity E to two other rods (rods G-E and E-F). These last rods have in this way, each have an extremity coinciding with the point E and the other two extremities are respectively pivotally or hingedly connected to the crankcase (point G) and to the piston pin (point F).

KINEMATIC ANALYSIS

The crank mechanism of the present invention has the characteristic of having four dead centres, if as dead centres we intend the positions of the rods (namely when there are particular alignments of the rods) in whi h the piston has null velocity.

Figure 4:
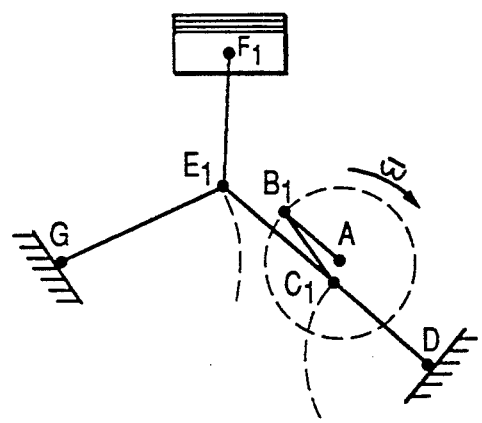
Figure 5:
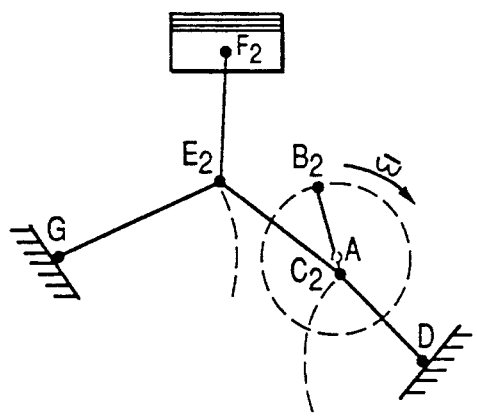

In this way, the mechanism will be at a dead centre position when there is the alignment of the rods of the traditional crank mechanism (rods A-B and B-C) or when the rods C-D and E-C are aligned. These situations are represented in FIGS. 3, 4, 5 and 6, which show respectively the external dead centre and the three internal dead centres. Two of these last internal dead centres correspond to an end stroke position (FIGS. 5 and 6) while other internal dead centre corresponds to a position of the piston too much near the end stroke position (FIG. 5). In other words, from the external dead centre the piston begins its upward run which has a catch when there is an alignment of the rods $C_1$-D and $E_1$-$C_1$ (FIG. 4). Then, the piston reverses its run moving away only a little from the position occupied previously and that corresponds with the dead centre which is one of the component crank mechanism (FIG. 5), and then the piston goes up again and reaches the third dead centre which corresponds to the alignment of the rods $C_3$-D and $E_3$-$C_3$ FIG. 6. The crank completes itself with the outside ram travel, carrying back the piston to the external dead centre.

Summing up, the outside stroke (induction and expansion stroke) is subtended by the angle $\theta_u$, (FIG. 2) the inside stroke (compression and exhaust stroke) is subtended by the angle $\theta_i$, and the angle $\theta_M$ subtends the catch of the piston in the neighbourhood of internal dead centre (FIG. 2); namely between the first and the third internal dead centre, the piston moves itself with such small velocities and shiftings (a few hundredth of millimeter for an angle $\theta_M$ of 60 degrees and a run of 70 millimeters) that we can consider it as in a stopped position.

Figure 2:
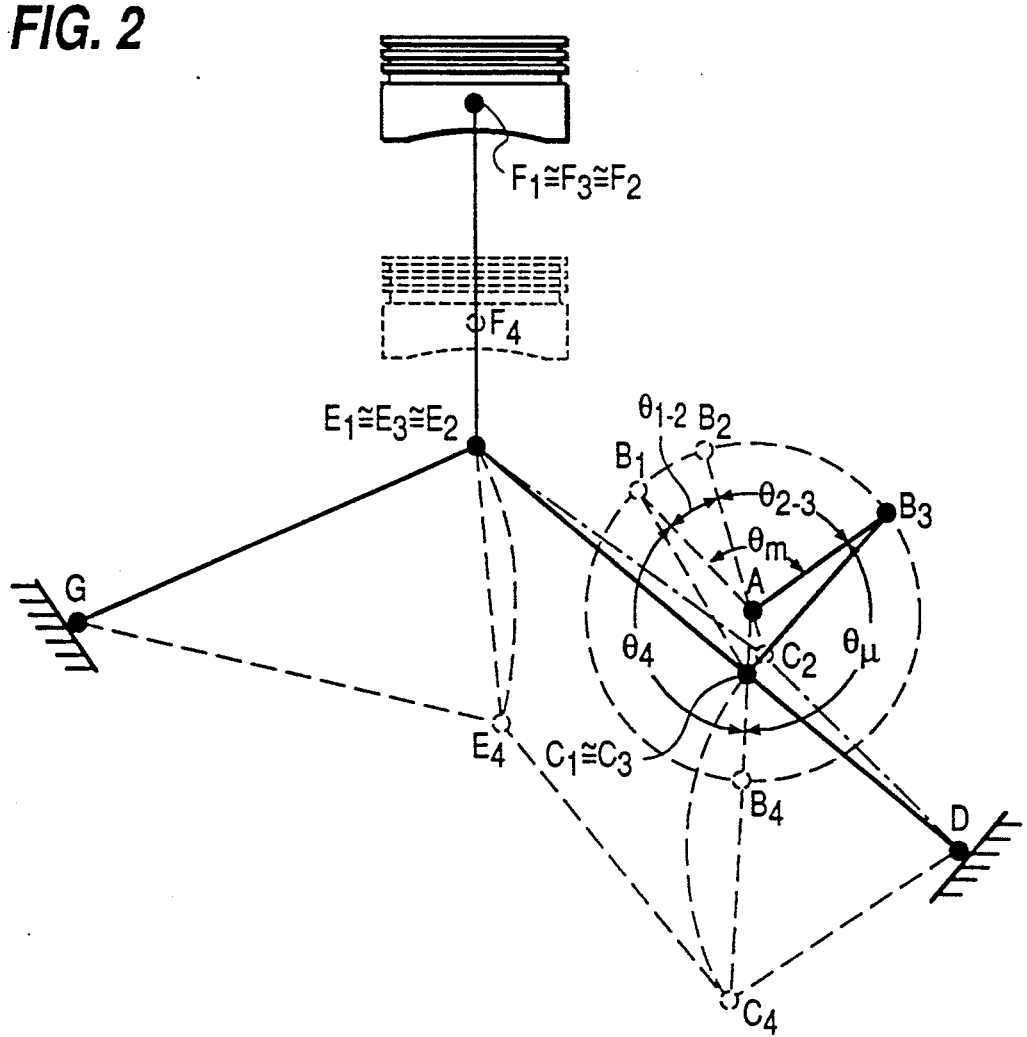
FIG. 2 shows the positions and the characteristic angles coinciding with the four dead centers of the crank mechanism.
Figure 3:
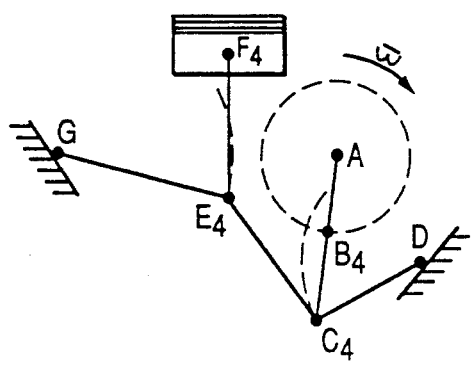
FIGS. 3, 4, 5, 6, respectively, schematically represent the rods positioned at the four dead centers.

In more detail, from the external dead center in which the extremities of the rods are in the position A $B_4$ $C_4$ D $E_4$ $F_4$ G, the piston starts its upward run which lasts a period of time that is proportional to the angle $\theta_i$ and reaches the internal dead center coinciding with the position A $B_1$ $C_1$ D $E_1$ $F_1$ G of the crank mechanism as shown in FIG. 2.

From this first internal dead center the piston goes down for an angle $\theta_{1-2}$ allowing the system to reach the position A $B_2$ $C_2$ D $E_2$ $F_2$ G coinciding with the second internal dead center as shown in FIG. 2.

Then, for an angle $\theta_{2-3}$, the upward run of the piston allows the system to reach the position A $B_3$ $C_3$ D $E_3$ $F_3$ G coinciding with the third internal dead center. From this position, the piston goes down for an angle $\theta_u$ and goes back to the initial position coinciding with the external dead center. The crank mechanism of the present invention gives the possibility of having four dead centres, but this condition is not necessary since also if we have only two dead centres (this condition happens when we plan in such a way that the rods E-C and C-D, during the motion, are not aligned) the piston motion is more slow in the neighbourhood of the internal dead centres in respect of the external dead centres.

THERMODYNAMIC ANALYSIS

In order that the proposed crank mechanism has an efficient thermodynamic, it is indispensable that the rules wich regulate the piston motion have to give to the evolving fluid some characteristics more near the ideal criteria; in other words, the cycle which has to come out must be, as regards the traditional one (with the same turnvelocity $\bar{\omega}$), more similar to the limit cycle which, as well known, is composed of isometric combustions and of compressions and expansions without heat-exchanges. This isometric combustion is achieved because the piston is practically stopped during the alternation of the three internal dead centres. We have smaller quantities of heat which are exchanged between evolving fluid and cylinder walls because these last ones are set free from the piston for a smaller period of time (proportional to the angle $\theta_i$ and $\theta_u$) than the traditional crank mechanism (with the same turn velocities $\bar{\omega}$).

As regards the intake and exhaust strokes, we can declare that during the inside stroke the losses of load are attenuated because we have the possibility of utilizing a part of the angle $\theta_M$ shown in FIG. 2 for letting open the inlet valve. In this way, on requesting of engine-fluid, this valve is almost completely opened.

We can divide the exhaust stroke in three parts (one more than traditional ones): spontaneous exhaust, forced exhaust, and, utilizing again a part of the angle $\theta_M$, another spontaneous exhaust obtained, delaying the closing of the exhaust valve.

ECOLOGICAL FACTORS

The crank mechanism of the present invention is very interesting also as regards the ecological point of view because it allows a more complete combustion, and a reduction of combustible and lubrificating oil consumptions. The latter are due to the minor friction between the piston and the cylinder wall.

FORCES OF INERTIA

Figure 9:
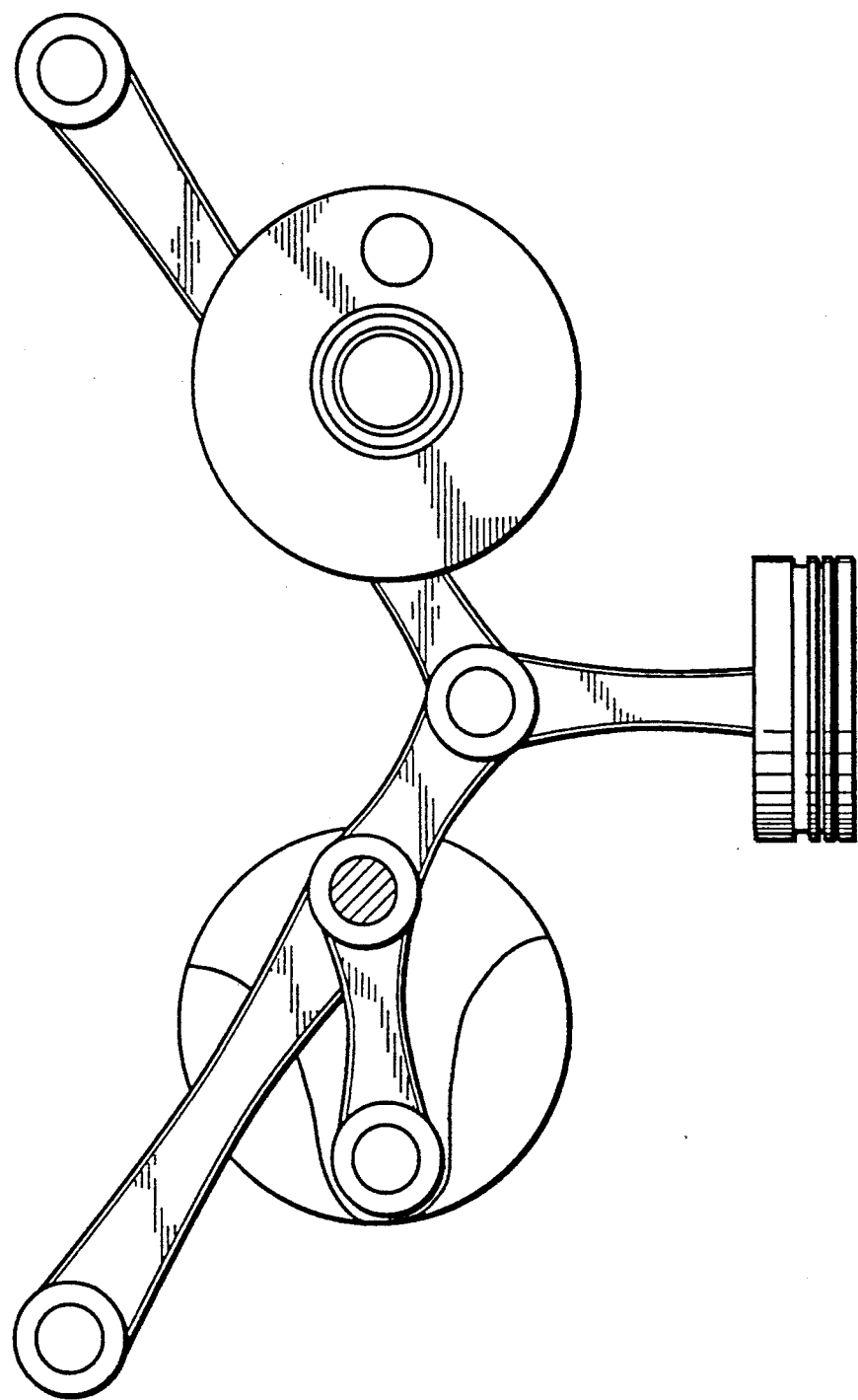
FIG. 9 is a sectional view taken alone line 9—9 of FIG. 10.
Figure 10:
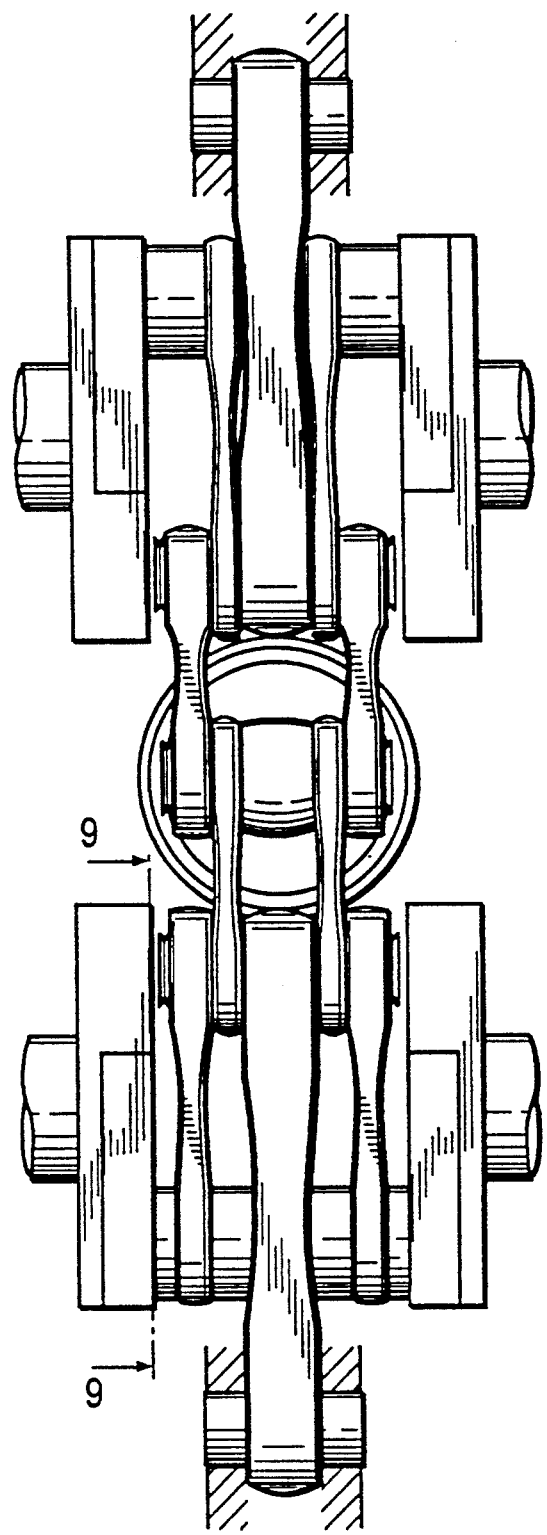
FIG. 10 is a top view of a twin crank mechanism according to the present invention.

The complexity of the present crank mechanism determines an increase of the forces of inertia which oblige us at a low number of revolutions. To surmount these disadvantages, when, besides a good efficiency, we want also high powers, we prefer the variant of this new crank mechanism illustrated in FIGS. 9 and 10 in which the inertial forces discharge themself on two crankshafts rotating in opposite ways and in which there are no closing forces of the kinematic couple cylinder-piston.

Figure 1:
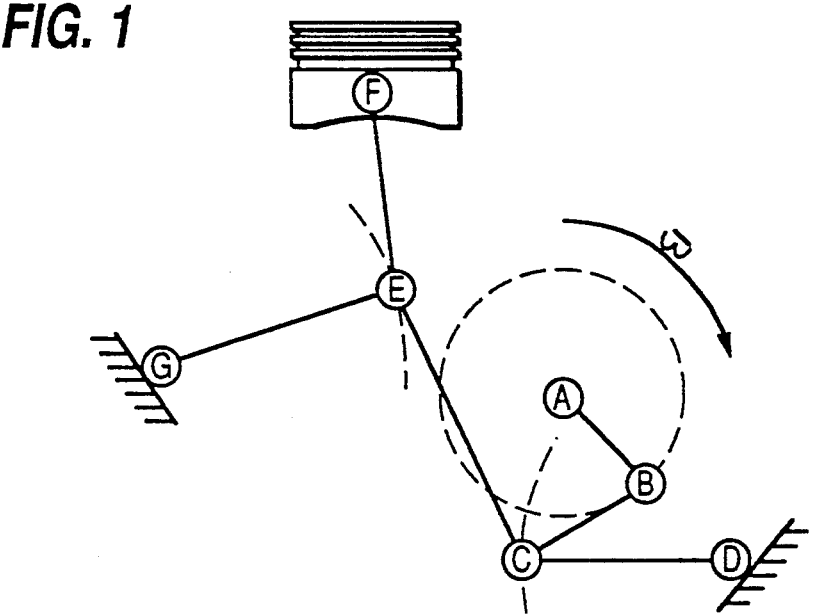
FIG. 1 shows a schematic representation of a crank mechanism according to the present invention.

The crank mechanism of this embodiment in its schematic representation, is composed of the crank mechanism shown in FIG. 1 in which has been eliminated the rod G-E, and the rod E-F is one block with the piston. The entire system is symmetric in respect of the axis of the cylinder.

I claim:

1. A crank mechanism for the transformation of a rotary movement of a crank supported in a crankcase into reciprocating movement of a piston in a cylinder, said mechanism comprising:
   an open kinematic chain comprised of first, second and third rods, pivotally connected together, said first and third rods being pivotally connected at their outer ends to said crankcase, said first rod being pivotally connected to said second rod at a first pivotal connection and said second rod being pivotally connected at a second pivotal connection to said third rod;
   a fourth rod connecting said piston to said first pivotal connection; and
   a fifth rod connecting a crank pin of said crank mechanism to said second pivotal connection.

2. A crank mechanism according to claim 1 in which at least some of the rods connecting the pivotal connections are separated and disposed on either side of a plane perpendicular to the axis of each pivotal connection.

3. A crank mechanism, for the transformation of a rotary movement of a pair of cranks supported in a crankcase into reciprocating movement of a piston in a cylinder, said mechanism comprising:
   an open kinematic chain comprised of first, second, third and fourth rods pivotally connected together, said first and fourth rods being pivotally connected at their outer ends to said crankcase, said first rod being pivotally connected to said second rod at a first pivotal connection, said second rod being pivotally connected to said third rod at a second pivotal connection and said third rod being pivotally connected to said fourth rod at a third pivotal connection;
   a fifth rod connecting said piston to said second pivotal connection;
   a sixth rod connecting a first crank pin of said crank mechanism to said first pivotal connection;
   a seventh rod connecting a second crank pin of said crank mechanism to said third pivotal connection;
   and wherein said mechanism is symmetric with respect to an axis of said cylinder which is perpendicular to a straight line through both ends of said chain.

4. A crank mechanism according to claim 3, in which at least some of the rods connecting the pivotal connection are separated and disposed on either side of a plane perpendicular to the axis of each pivotal connection.

* * * * *

UNITED STATES PATENT AND TRADEMARK OFFICE
CERTIFICATE OF CORRECTION

PATENT NO. : 5,309,779
DATED : May 10, 1994
INVENTOR(S) : Cosimo SARNO

It is certified that error appears in the above-identified patent and that said Letters Patent is hereby corrected as shown below:

Column 1, line 12, before "crank" insert --the--;

line 63, change "5" to --4--;

line 64, change "and 6) while" to

--and 6), while the--.

Figure 6:
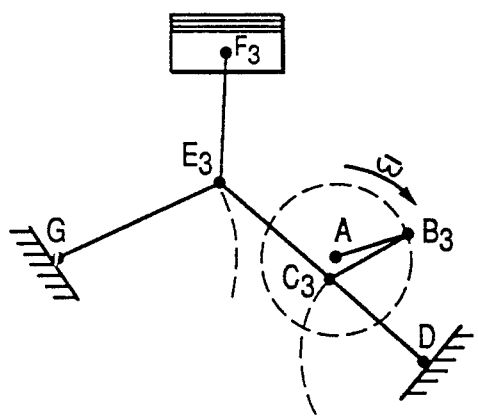

Column 2, line 7, change "FIG. 6. The crank"

to --(FIG. 6). The turn crank--.

UNITED STATES PATENT AND TRADEMARK OFFICE
CERTIFICATE OF CORRECTION

PATENT NO. : 5,309,779

DATED : May 10, 1994

INVENTOR(S) : Cosmimo Sarno

It is certified that error appears in the above-indentified patent and that said Letters Patent is hereby corrected as shown below:

Column 3, line 12, change "combustion" to --combustion --;

line 22, change " powers, " to --power --.

Signed and Sealed this

Sixth Day of September, 1994

Attest:

BRUCE LEHMAN

Attesting Officer    Commissioner of Patents and Trademarks